(12) United States Patent
Lo et al.

(10) Patent No.: US 11,606,350 B2
(45) Date of Patent: Mar. 14, 2023

(54) INITIATING PROVISIONING OF AN EXISTING ACCOUNT BASED ON AN UNAUTHENTICATED REQUEST

(71) Applicant: The Toronto-Dominion Bank, Toronto (CA)

(72) Inventors: Kelvin Chun-Yin Lo, Toronto (CA); Guillaume Roberge, Montreal (CA); Francis Carle, Montreal (CA); Robert Bigras, Montreal (CA); Brigitte Houde, Montreal (CA)

(73) Assignee: The Toronto-Dominion Bank, Toronto (CA)

( * ) Notice: Subject to any disclaimer, the term of this patent is extended or adjusted under 35 U.S.C. 154(b) by 235 days.

(21) Appl. No.: 17/020,882

(22) Filed: Sep. 15, 2020

(65) Prior Publication Data
US 2022/0086140 A1 Mar. 17, 2022

(51) Int. Cl.
*H04L 9/40* (2022.01)
*G06F 21/46* (2013.01)
*H04L 9/08* (2006.01)

(52) U.S. Cl.
CPC ...... *H04L 63/0838* (2013.01); *H04L 63/0428* (2013.01); *G06F 21/46* (2013.01); *H04L 9/0863* (2013.01)

(58) Field of Classification Search
CPC ............. H04L 63/0838; H04L 63/0428; H04L 9/0863; H04L 9/40; H04L 9/08; G06F 21/46
See application file for complete search history.

(56) References Cited

U.S. PATENT DOCUMENTS

| | | | |
|---|---|---|---|
| 7,761,083 B2* | 7/2010 | Marsh | H04L 67/01 455/406 |
| 7,926,711 B2 | 4/2011 | Taylor et al. | |
| 8,918,306 B2 | 12/2014 | Cashman et al. | |
| 9,560,204 B1 | 1/2017 | Lindley et al. | |
| 2005/0222924 A1 | 10/2005 | Sumino et al. | |
| 2006/0020783 A1 | 1/2006 | Fisher | |
| 2009/0037230 A1 | 2/2009 | Tracy et al. | |
| 2009/0125386 A1* | 5/2009 | Willison | G06Q 30/0226 705/14.27 |
| 2009/0164258 A1 | 6/2009 | Broodryk | |
| 2014/0074719 A1* | 3/2014 | Gressel | G06Q 30/06 713/168 |
| 2014/0081670 A1* | 3/2014 | Lim | G06Q 10/10 705/4 |
| 2014/0229379 A1* | 8/2014 | Jang | G06Q 20/28 705/44 |

(Continued)

*Primary Examiner* — Jayesh M Jhaveri
(74) *Attorney, Agent, or Firm* — Rowand LLP

(57) ABSTRACT

A computer-implemented method may include: receiving, from a first electronic device during an unauthenticated session, a request for provisioning data, the request associated with identification data insufficient to begin an authenticated session; determining, based on the identification data, whether the request for the provisioning data is associated with an existing account; when the request for the provisioning data is determined to be associated with an existing account, obtaining the provisioning data based on a modifier not available if the request for the provisioning data is not determined to be associated with an existing account; and sending the provisioning data to the first electronic device.

18 Claims, 9 Drawing Sheets

(56) References Cited

U.S. PATENT DOCUMENTS

| | | | |
|---|---|---|---|
| 2016/0239862 A1* | 8/2016 | Kwak | G06Q 30/0233 |
| 2017/0070346 A1* | 3/2017 | Lombardi | H04W 12/06 |
| 2018/0026949 A1* | 1/2018 | Kimn | H04L 9/0827 |
| | | | 713/156 |
| 2021/0200903 A1* | 7/2021 | Singh | G06F 21/645 |

* cited by examiner

US 11,606,350 B2

INITIATING PROVISIONING OF AN EXISTING ACCOUNT BASED ON AN UNAUTHENTICATED REQUEST

FIELD

This relates to account provisioning on computer systems and, more particularly, to methods and systems for remotely provisioning an existing account when a request for provisioning data is received in an authenticated session with a remote computing device.

BACKGROUND

Sometimes when a server that is associated with a number of user accounts interacts with a remote computing device over the Internet it may provide incorrect data to the remote computing device since it may provide data intended for consumption by non-account holders when the remote computing device is, in fact, associated with an existing account. In some instances, this may result in the unintended creation of duplicate accounts at the server and, in some instances, this may result in an account being provisioned with erroneous provisioning data. For example, a new account may be created for an existing account holder and provisioned with data that is only intended for new accounts rather than special provisioning data that would only be available when provisioning an existing account.

BRIEF DESCRIPTION OF THE DRAWINGS

Embodiments are described in detail below, with reference to the following drawings.

Like reference numerals are used in the drawings to denote like elements and features.

DETAILED DESCRIPTION OF EXAMPLE EMBODIMENTS

Figure 1:
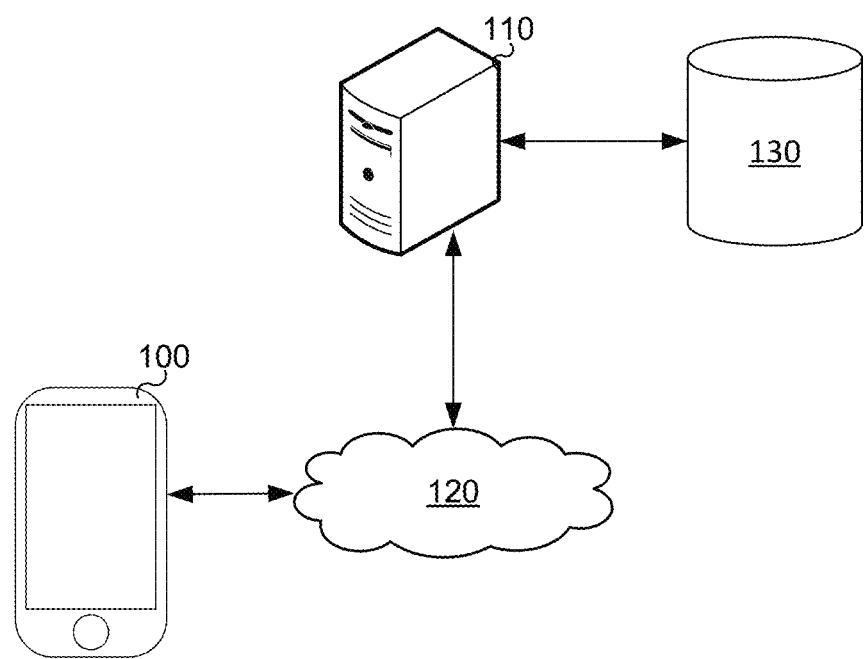
FIG. 1 is a schematic operation diagram illustrating an operating environment of an example embodiment according to the subject matter of the present application.

According to the subject matter of the present application there may be provided a computer system. The computer system may include a processor. The computer system may include a communications module coupled to the processor. The computer system may include a memory coupled to the processor. The memory may store instructions that, when executed, configure the processor to: receive, from a first electronic device during an unauthenticated session, a request for provisioning data, the request associated with identification data insufficient to begin an authenticated session; determine, based on the identification data, whether the request for the provisioning data is associated with an existing account; when the request for the provisioning data is determined to be associated with an existing account, obtain the provisioning data based on a modifier not available if the request for the provisioning data is not determined to be associated with an existing account; and send the provisioning data to the first electronic device.

Conveniently, in this way, special provisioning data that is only available to existing accounts may be sent to an electronic device even when that electronic device has not authenticated as being associated with an existing account. Put differently, the special provisioning data may be sent to the electronic device when it is suspected that the electronic device is associated with an existing account, even if the electronic device has not yet proven that it is, in fact, associated with an existing account.

However, the special provisioning data may not be acted on until after the electronic device has proven that it is, in fact, associated with the existing account.

For example, in at least some implementations, the instructions may further configure the computer system to: receive, from the first electronic device, a request to proceed with provisioning based on the provisioning data; responsive to receiving the request to proceed with provisioning based on the provisioning data, generate a one-time password and send an indication of the one-time password to an address associated with the existing account determined to be associated with the request for the provisioning data; receive, from the first electronic device, an indication including a value purported to be the one-time password; compare the one-time password to the value purported to be the one-time password to confirm the value purported to be the one-time password matches the one-time password; and upon confirming that the value purported to be the one-time password matches the one-time password, provision the existing account based on the provisioning data.

Conveniently, in this way, the account may only be provisioned with the special provisioning data that is only available for existing account-holders if it is proven, through use of the one-time password, that the electronic device that received the provisioning data was, in fact, associated with an existing account.

Among other things, at least some methods and systems described herein may prevent duplicate account creation. Conveniently, this may reduce storage burdens at a server.

In some implementations, the provisioning data may be a first value and the modifier may be a reduction operation applied to a second value used as the provisioning data if the request for the provisioning data was not determined to be associated with an existing account. In some implementations, the first value may define a quantity associated with one or more data transfers to be made.

In some implementations, provisioning the existing account based on the provisioning data may include configuring the account to enable a feature or product.

In some implementations, the instructions further configure the computer system to: after determining that the value purporting to be the one-time password does not match the one-time password: obtain second provisioning data that is not based on the modifier; send the second provisioning data to the first electronic device; receive, from the first electronic device, a request to proceed with provisioning based on the second provisioning data; responsive to receiving the request to proceed with provisioning based on the second provisioning data: create a new account; and provision the new account based on the second provisioning data.

In some implementations, the instructions may further configure the computer system to: after determining that the value purporting to be the one-time password does not match the one-time password: create a new account; provision the new account based on the provisioning data; and flag the new account for removal of the modifier after expiry of a time period.

In some implementations, the instructions may further configure the computer system to send, to the first electronic device, a request to input the one-time password.

In some implementations, the instructions may further configure the computer system to, after determining that the request for the provisioning data is associated with an existing account, send to the first electronic device an indication that the request for the provisioning data has been determined to be associated with an existing account.

In some implementations, the instructions may further configure the computer system to receive, from the first electronic device, an indication to confirm that the request for the provisioning data is associated with the existing account. The provisioning data may be sent in response to receiving the indication to confirm that the request for the provisioning data is associated with the existing account.

In some implementations, the instructions may further configure the computer system to determine that the request for the provisioning data is associated with an existing account when at least a plurality of predetermined fields of the identification data match corresponding fields in the account irrespective of whether one or more other predetermined fields in the plurality of fields of the identification data do not match corresponding fields in the account.

In some implementations, the identification data may include publicly available data and excludes a secret code.

According to the subject matter of the present application, there may be provided a computer-implemented method. The method may include: receiving, from a first electronic device during an unauthenticated session, a request for provisioning data, the request associated with identification data insufficient to begin an authenticated session; determining, based on the identification data, whether the request for the provisioning data is associated with an existing account; when the request for the provisioning data is determined to be associated with an existing account, obtaining the provisioning data based on a modifier not available if the request for the provisioning data is not determined to be associated with an existing account; and sending the provisioning data to the first electronic device.

In some implementations, the method may further include: receiving, from the first electronic device, a request to proceed with provisioning based on the provisioning data; responsive to receiving the request to proceed with provisioning based on the provisioning data, generating a one-time password and send an indication of the one-time password to an address associated with the existing account determined to be associated with the request for the provisioning data; receiving, from the first electronic device, an indication including a value purported to be the one-time password; comparing the one-time password to the value purported to be the one-time password to confirm the value purported to be the one-time password matches the one-time password; and upon confirming that the value purported to be the one-time password matches the one-time password, provisioning the existing account based on the provisioning data.

In some implementations, the provisioning data may be a first value and the modifier may be a reduction operation applied to a second value used as the provisioning data if the request for the provisioning data was not determined to be associated with an existing account. In some implementations, the first value may define a quantity associated with one or more data transfers to be made.

In some implementations, provisioning the existing account based on the provisioning data may include configuring the account to enable a feature or product.

In some implementations, the method may further include: after determining that the value purporting to be the one-time password does not match the one-time password: obtaining second provisioning data that is not based on the modifier; send the second provisioning data to the first electronic device; receiving, from the first electronic device, a request to proceed with provisioning based on the second provisioning data; responsive to receiving the request to proceed with provisioning based on the second provisioning data: creating a new account; and provisioning the new account based on the second provisioning data.

In some implementations, the method may further include: after determining that the value purporting to be the one-time password does not match the one-time password: creating a new account; provisioning the new account based on the provisioning data; and flagging the new account for removal of the modifier after expiry of a time period.

In some implementations, the method may include sending, to the first electronic device, a request to input the one-time password.

In some implementations, the method may include, after determining that the request for the provisioning data is associated with an existing account, sending to the first electronic device an indication that the request for the provisioning data has been determined to be associated with an existing account.

In some implementations, the method may further include receiving, from the first electronic device, an indication to confirm that the request for the provisioning data is associated with the existing account. The provisioning data may be sent in response to receiving the indication to confirm that the request for the provisioning data is associated with the existing account.

In some implementations, the method may further include determining that the request for the provisioning data is associated with an existing account when at least a plurality of predetermined fields of the identification data match corresponding fields in the account irrespective of whether one or more other predetermined fields in the plurality of fields of the identification data do not match corresponding fields in the account.

In some implementations, the identification data may include publicly available data and excludes a secret code.

In some implementations, there may be provided a computer-readable storage medium. The computer-readable storage medium may be a non-transitory computer-readable storage medium. The computer-readable storage medium may store instructions which, when executed by a processor of a computer system, cause the computer system to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

FIG. 1 is a schematic operation diagram illustrating an operating environment of an example embodiment.

As illustrated, a client computer system 100, which may also be referred to as a first electronic device or a remote electronic device herein, is in communication with a server computer system 110 via a first network 120. The client computer system 100 is geographically remote from the server computer system 110 and vice-versa.

The client computer system 100 may be a mobile computing device such as, for example, a smart phone as shown in the FIG. 1. However, the client computer system 100 may be a computing device of another type such as, for example, a personal computer, a laptop computer, a tablet computer, a notebook computer, a hand-held computer, a personal digital assistant, a portable navigation device, a mobile phone, a wearable computing device (e.g., a smart watch, a wearable activity monitor, wearable smart jewelry, and glasses and other optical devices that include optical head-mounted displays), an embedded computing device (e.g., in communication with a smart textile or electronic fabric), and any other type of computing device that may be configured to store data and software instructions, and execute software instructions to perform operations consistent with disclosed embodiments.

The server computer system 110, which may also be referred to as a server, is a computer server system. A computer server system may, for example, be a mainframe computer, a minicomputer, or the like. In some implementations thereof, a computer server system may be formed of or may include one or more computing devices. A computer server system may include and/or may communicate with multiple computing devices such as, for example, database servers, compute servers, and the like. Multiple computing devices such as these may be in communication using a computer network and may communicate to act in cooperation as a computer server system. For example, such computing devices may communicate using a local-area network (LAN). In some embodiments, a computer server system may include multiple computing devices organized in a tiered arrangement. For example, a computer server system may include middle tier and back-end computing devices. In some embodiments, a computer server system may be a cluster formed of a plurality of interoperating computing devices.

The first network 120 is a computer network. In some embodiments, the first network 120 may be an internetwork such as may be formed of one or more interconnected computer networks. For example, such a network may be or may include an Ethernet network, an asynchronous transfer mode (ATM) network, a wireless network, or the like. For example, the first network 120 could be the Internet.

The server computer system 110 may be associated with a database 130 that stores account data. By way of example, the accounts may be user or customer accounts. The accounts include historical data such as, for example, historical payment data including, for example, services charges made to an account, payments received from a user, etc. The accounts may be associated with credentials. The credentials may include a secret code, such as a password or pin that may be used by remote electronic devices, such as the client computer system 100, to begin an authenticated session with the server computer system 110. The accounts include account-holder biographical data. Such data may include any one or a combination of: a personal name, a geographic address, a messaging address (such as an email address), a telephone number, a date of birth, etc.)

Figure 2:
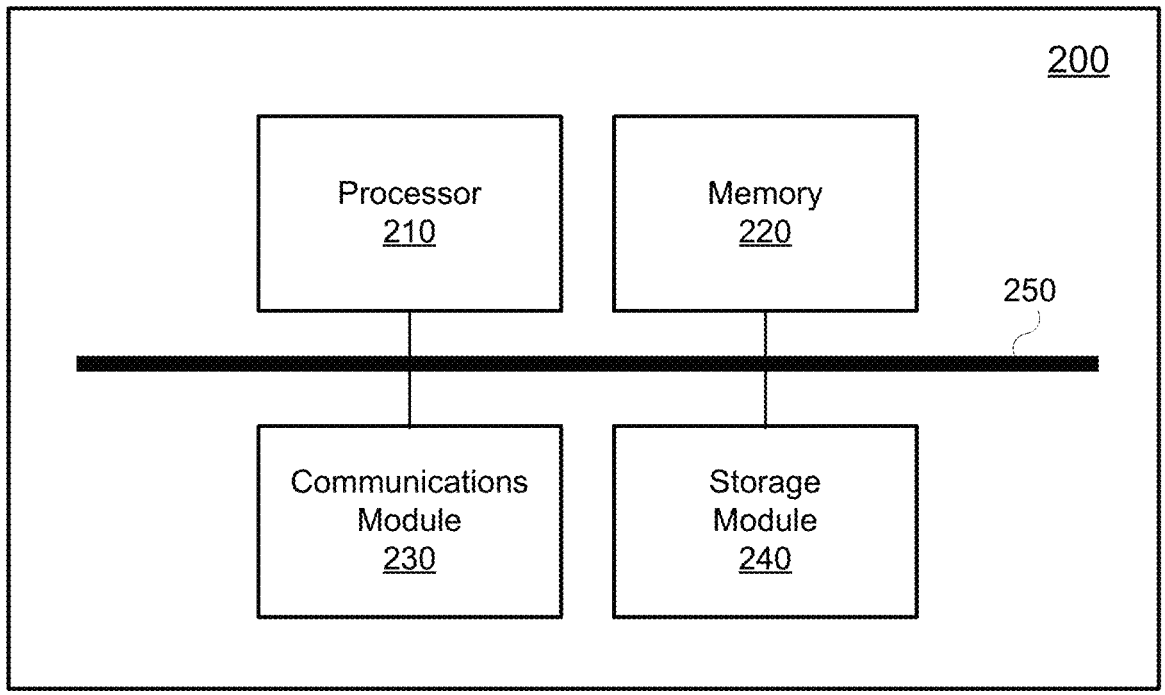
FIG. 2 shows a high-level schematic diagram of a computer system.

FIG. 2 is a high-level schematic diagram of a computer system 200. The computer system 200 may be any one of the client computer system 100 and/or server computer system 110.

The computer system 200 includes a variety of modules. For example, as illustrated, the computer system 200 may include a processor 210, a memory 220, a communications module 230, and/or a storage module 240. Further, while not illustrated in FIG. 2, the computer system 200 may include an I/O module. As illustrated, the foregoing example modules of the computer system 200 are in communication over a bus 250. As such, the bus 250 may be considered to couple the various modules of the computer system 200 to each other, including, for example, to the processor 210.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the computer system 200.

The communications module 230 allows the computer system 200 to communicate with other computing devices and/or various communications networks such as, for example, the first network 120. For example, the communications module 230 may allow the computer system 200 to send or receive communications signals. Communications signals may be sent or received according to one or more protocols or according to one or more standards. The communications module 230 may allow the computer system 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 230 may allow the computer system 200 to communicate using near-field communication (NFC), via Wi-Fi™, using Bluetooth™ or via some combination of one or more networks or protocols. In some embodiments, all or a portion of the communications module 230 may be integrated into a component of the computer system 200. For example, the communications module 230 may be integrated into a communications chipset.

The I/O module is an input/output module. The I/O module allows the computer system 200 to receive input from and/or to provide input to components of the computer system 200 such as, for example, various input modules and output modules. For example, the I/O module may, as shown, allow the computer system 200 to receive input from and/or provide output to a display.

The storage module 240 allows data to be stored and retrieved. In some embodiments, the storage module 240 may be formed as a part of the memory 220 and/or may be used to access all or a portion of the memory 220. Additionally or alternatively, the storage module 240 may be used to store and retrieve data from persisted storage other than the persisted storage (if any) accessible via the memory 220. In some embodiments, the storage module 240 may be used to store and retrieve data in/from a database, such as the database 130 of FIG. 1 when the computer system is operating as the server computer system 110 of FIG. 1. A database may be stored in persisted storage. Additionally or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely.

Software comprising instructions is executed by the processor 210 from a computer-readable medium. For example, software may be loaded into random-access memory from persistent storage of the memory 220. Additionally or alternatively, instructions may be executed by the processor 210 directly from read-only memory of the memory 220.

Figure 3:
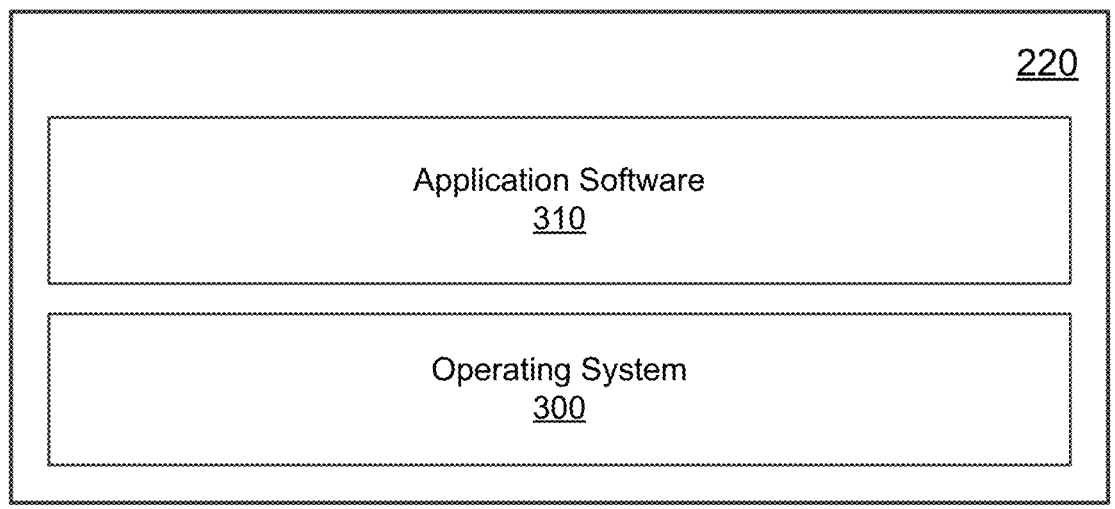
FIG. 3 shows a simplified organization of software components stored in a memory of the computer system of FIG. 2.

FIG. 3 depicts a simplified organization of software components stored in the memory 220 of the computer system 200. As illustrated, these software components include an operating system 300 and an application software 310.

The operating system 300 is software. The operating system 300 allows the application software 310 to access the processor 210 (FIG. 2), the memory 220, the communications module 230, the I/O module 240, and the storage module 240 of the client computer system 100. The operating system 300 may be, for example, Google™ Android™, Apple™ iOS™, UNIX™, Linux™, Microsoft™ Windows™, Apple OSX™ or the like.

The application software 310 adapts the computer system 200, in combination with the operating system 300, to operate as a device for performing a specific function. For example, where the computer system 200 is an instance of the client computer system 100, the application software 310 adapts the computer system 200 to engage with the server computer system during an account provisioning process.

Where the computer system 200 is the server computer system 110, the application software 310 adapts the computer system 200 to perform operations associated with the server computer system 110 described herein including, for example, to detect when a request received from a client computer system 100 is likely associated with an existing account, even when that client computer system 100 has not authenticated itself to the server computer system 110. The application software 310 may adapt the computer system 200 to provide provisioning data, such as a quote, that is based on whether the client computer system 100 is associated with an existing account. For example, the provisioning data may be different if the client computer system 100 is associated with an existing account than if it were not associated with an existing account. By way of example, if the client computer system 100 were associated with an existing account, a discounted quote or rate may be provided that would not be provided if the client computer system 100 were not associated with an existing account. The application software 310 may adapt the computer system 200 to use a one-time-password (OTP) to confirm that the client computer system 100 is, in fact, associated with the existing account and to provision the existing account with the provisioning data that is for existing accounts after successful authentication using the OTP.

Where the computer system 200 is a smartphone or tablet, the application software 310 may be or may be a part of a smartphone or tablet application or "app". In a particular example in which the computer system 200 is the client computer system 100, the application software 310 may be or may include a mobile wallet application as mentioned above.

Figure 4:
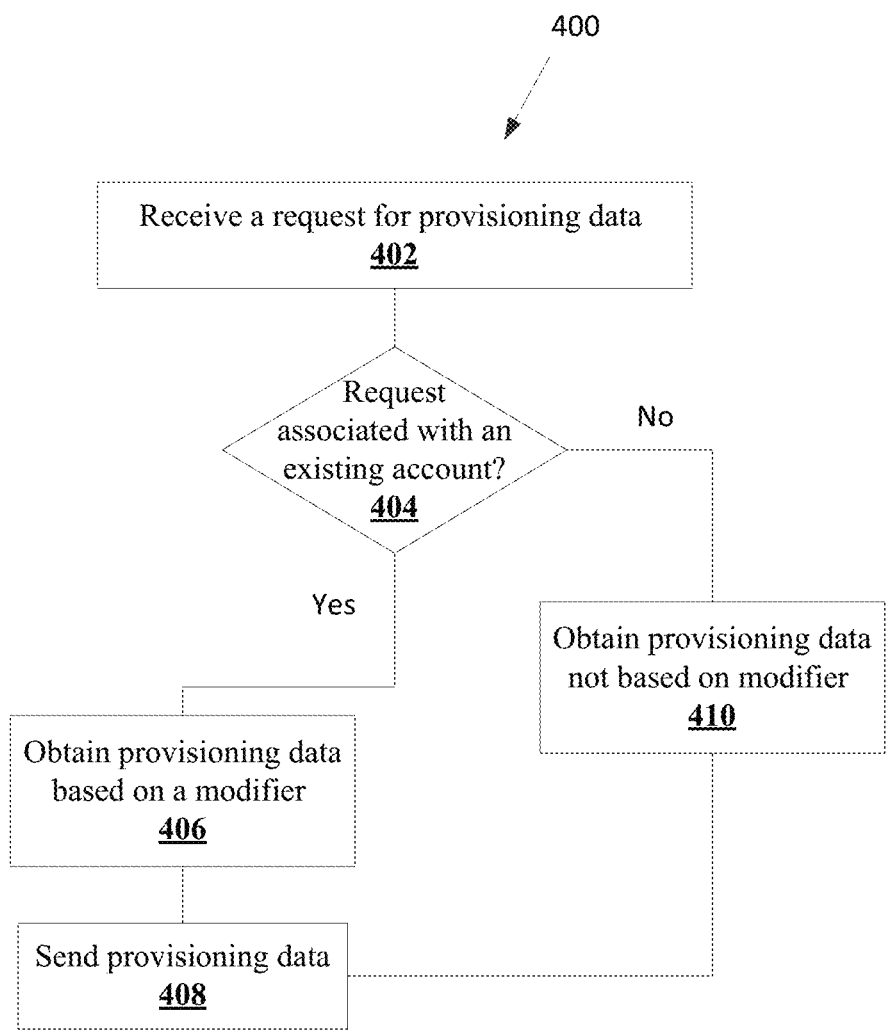
FIG. 4 is a flowchart showing operations performed in sending provisioning data.

FIG. 4 provides a flowchart illustrating a method 400 for sending provisioning data to an electronic device, where the provisioning data is dependent upon whether the electronic device is associated with an existing account.

In performing the method 400, operations starting from an operation 402 and continuing onward are performed by a processor of the server computer system 110. For example, where the server computer system 110 is or includes an instance of the example computer system 200, the operations may be performed by the processor 210 executing instructions such as, for example, from the memory 220. Those instructions may, for example, be part of a suitable instance of the application software 310 (FIG. 3).

In performing the method 400, a server computer system 110 may be in communication with a first electronic device, such as the client computer system 100 of FIG. 1. Such communication may be by way of a network. The server computer system 110 may be or may be associated with a web server.

Prior to, during and/or after the method 400, the web server may serve one or more web pages to the client computer system 100 when the client computer system receives an instruction to retrieve such a page. The instruction may be received, for example, when a user instructs a web browser to retrieve content associated with a defined location, such as a location represented by an address (e.g., a uniform resource locator). The web browser may then retrieve the content and display the content on a display associated with the client computer system. In at least some implementations, the content may be associated with a service provider. The service provider may offer multiple services and it may be that the client computer system 100 is associated with a first service and that the web page is for adding or inquiring about adding a second service.

By way of example, in at least some implementations, the service provider may be an insurance provider. The client computer system 100 may already be associated with a home insurance policy. That is, the client computer system 100 may be operated by a customer having a home insurance policy that is provided by the insurance provider. The client computer system 100 may, in such a scenario, be navigating the web pages in order to obtain a quote on another insurance policy, such as an automobile insurance policy.

Since the exchanges between the client computer system 100 and the server computer system 110 occur in an unauthenticated session in which the client computer system 100 has not proven that it is associated with an account with the server computer system, the server computer system may not know when providing the web pages to the client computer system 100 that the client computer system 100 has an existing account and already subscribes to the first service. For example, the client computer system may be associated with a home insurance policy provided by a service provider that is associated with the server computer system 110 and may, therefore, have an account at the server computer system 110 but the server computer system 110 may not be able to initially determine that the client computer system is an existing account holder.

At an operation 402, the server computer system 110 receives, using the communications module and via a network, a request for provisioning data. The request is received from the first electronic device during an unauthenticated session, such as an unauthenticated web browsing session. By way of example, the request may be received during an unauthenticated session between a web browser on the client computer system 100 and a web server associated with the server computer system 110. The web server may be provided by the server computer system 110 in some implementations.

The request may be a request for provisioning data 402. The request may be associated with identification data. For example, identification data may be received at the server computer system 110 before, after or together with the request for provisioning data. The identification data is data that is insufficient to begin an authenticated session. By way of example, the identification may exclude a secret code. A secret code may also be referred to as a credential. The secret code may be a private secret that is used by an account-holder to authenticate to the server computer system 110. The secret code may, for example, be a password, PIN, biometric representation, etc.

The identification data may be or include publicly available (e.g., non-secret) data. By way of example, the identification data may be or include any one or a combination of: a personal name, a geographic address, a messaging address (such as an email address), a telephone number, a date of birth, etc.

The identification data may, in some implementations, be received through a web form. The web form may display a prompt on the client computer system requesting the identification data.

The provisioning request may be or include a request to obtain a quote for a service. By way of example, the provisioning request may be or include a request to obtain a quote for an insurance product, such as home or automobile insurance. By way of example, the provisioning request may be sent from the client computer system in response to activation of an interface element, such as a virtual button, suitable for such a purpose. The interface element may, in the case of the insurance example, display "Get Quote", "Submit", or another similar prompt.

At an operation 404, the server computer system 110 determines, based on the identification data, whether the request for the provisioning data is associated with an existing account. This determination may be performed by comparing the identification data to stored account-holder biographical data. By way of example, a name received from the client computer system may be compared to a name in the account-holder biographical data. By way of further example, a geographic address received from the client computer system may be compared to a geographic address in the account-holder biographical data. By way of further example, a messaging address (such as an email address) received from the client computer system may be compared to a messaging address in the account-holder biographical data. By way of further example, a telephone number received from the client computer system may be compared to a telephone number in the account-holder biographical data. By way of further example, a date of birth received from the client computer system may be compared to a date of birth in the account-holder biographical data.

The matching or comparison that is performed by the server computer system 110 may include any one or a combination of verbatim matching (which may also be referred to as strict matching), loose matching, and/or equivalent matching). Verbatim matching looks for exact matches. By way of example, a verbatim match may occur when the identification indicates a name of "Anthony Smith" and the account-holder biographical data also indicates the name of "Anthony Smith." Loose matching may account for small variations between the identification data and the account-holder biographical data such as, for example, typos. By way of example, a match may occur when the identification indicates a name of "Antony Smith" and the account-holder biographical data indicates the name of "Anthony Smith." Equivalent matching takes into account common data substitutions such as, for example "Anthony" with "Tony", "William" with "Bill", "Jeffrey" with "Jeff", and so on.

In some implementations, a single match of received identification data with account-holder biographical data may be sufficient to determine that the request for the provisioning data is associated with an existing account. For example, a matching email address may be sufficient. Or, where the account holder has an existing home insurance policy with the service provider that is associated with the server computer system, then a matching geographic address may be sufficient to determine that the request for the provisioning data is associated with an existing account. In some implementations, the server computer system may determine that the request for the provisioning data is associated with an existing account when some of the identification data does not match corresponding fields in the existing account. For example, where the name and address match that of an existing account, the server computer system may determine that the request for the provisioning data is associated with an existing account even where a received email address does not match that associated with the existing account.

In some implementations, the server computer system may determine that the request for the provisioning data is associated with an existing account when at least a plurality of predetermined fields of the identification data match corresponding fields in the account irrespective of whether one or more other predetermined fields in the plurality of fields of the identification data do not match corresponding fields in the account. For example, where the name and address match that of an existing account, the server computer system may determine that the request for the provisioning data is associated with an existing account even where a received email address does not match that associated with the existing account.

When the request for the provisioning data is determined to be associated with an existing account, the server computer system 110 may obtain special provisioning data. The special provisioning data is special in that is only available for existing account holders, or the method of obtaining it is only available for existing account holders. By way of example, the special provisioning data may be obtained based on a modifier not available if the request for the provisioning data is not determined to be associated with an existing account. By way of example, the modifier may be a reduction operation. A reduction operation is an operation that reduces a value from a value that it would otherwise be. By way of example, the reduction operation may be or include a subtraction, division or multiplication operation which reduces a value. For example, the provisioning data that is obtained based on the modifier (which may be referred to as first provisioning data) may be obtained by applying a reduction operation to a second value that would be used as the provisioning data if the request for the provisioning data was not determined to be associated with an existing account. The provisioning data (or, in the example above, the first provisioning data) may define a quantity associated with one or more data transfers that are to be made. For example, the provisioning data may represent a rate or quote and this may represent a quantum of value that is to be transferred to configure an account with a new service.

If, at operation 404, the server computer system 110 instead determines that the request for the provisioning data is not associated with an existing account, then the server computer system 110 may instead obtain regular (or non-special) provisioning data. The regular provisioning data is obtained without using the modifier that was used, or would be used, at operation 406 of the method 400.

After the provisioning data is obtained at operation 406 or operation 410, at an operation 408, the server computer system 110 may send the provisioning data to the client computer system. The provisioning data may be sent by the communications module via the network. The provisioning data may, in at least some implementations, be sent as a web page. By way of example, referring briefly to FIG. 8, an example interface 900, such as a web page, is illustrated. The example interface 900 may be displayed at the client computer system 100 based on provisioning data received from the server computer system 110.

Conveniently, by identifying likely account matches around or at the time when the provisioning request is received, the server computer system 110 may reduce redundant account creation. For example, the provisioning data may be stored, at the server computer system and/or at the database associated with the server computer system, in association with the existing account.

Furthermore, the server computer system 110 may also, after the matching, use data from the matched account-holder biographical data to automatically other fields associated with a form. For example, the account-holder biographical data may be used to auto-populate fields on the interface so that the user does not need to input such data.

Furthermore, by identifying likely account matches around or at the time when the provisioning request is received, the server computer system 110 may increase the accuracy of the provisioning data. For example, customers that are eligible for multi-line discounts may automatically be quoted as though they are eligible.

However, since the identification data may be publicly available data it is possible that a fraudster may input at least some false identification data in order to attempt to obtain provisioning data that is only available for existing account holders. In at least some implementations, the method 400 may be coupled with a method 500 which may enhance security and make it more difficult for a possible fraudster from posing as another.

Figure 5:
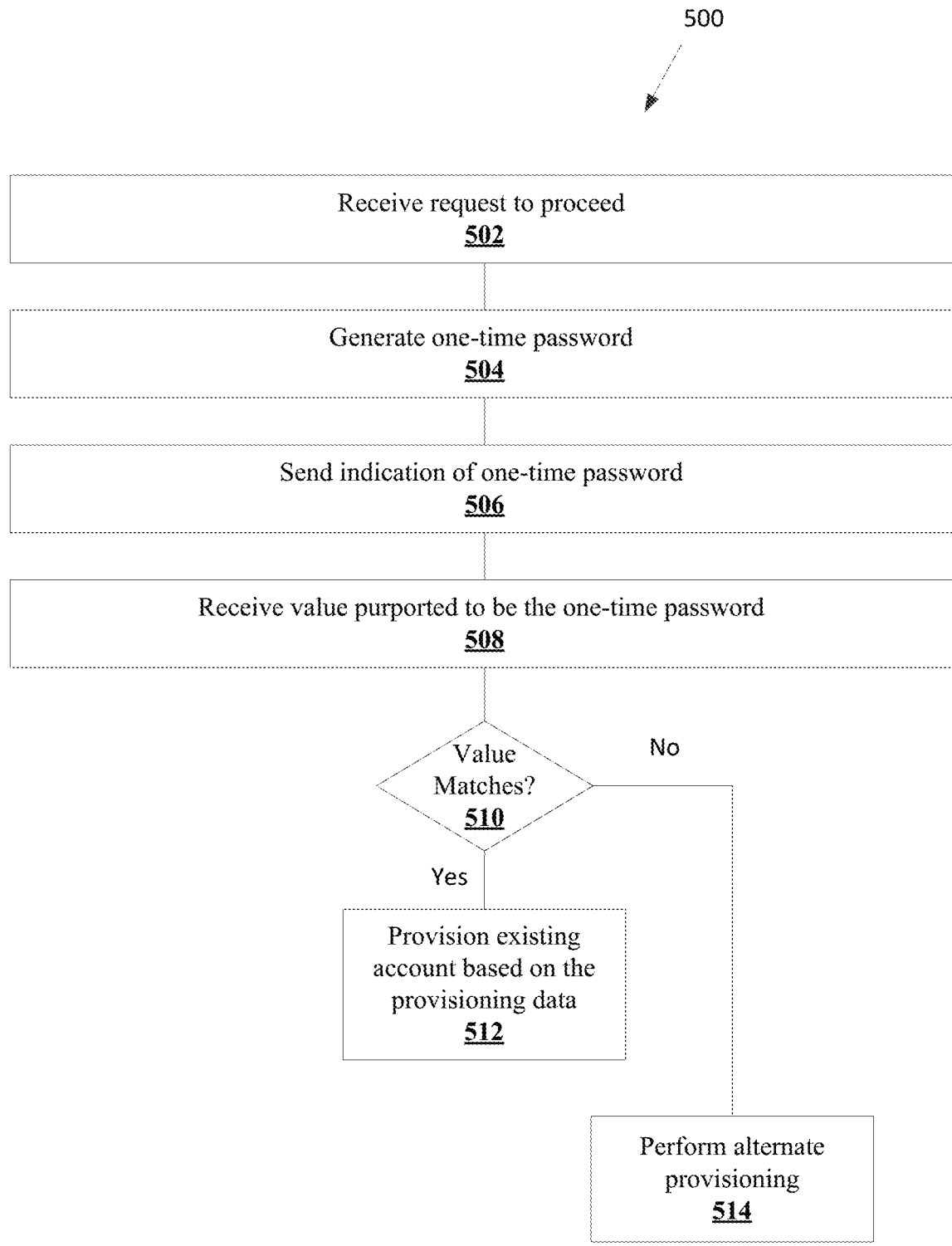
FIG. 5 is a flowchart showing operations performed in provisioning an account.

Referring now to FIG. 5, a flowchart of a method 500 for provisioning an existing account based on provisioning data is illustrated.

In performing the method 500, operations starting from an operation 502 and continuing onward are performed by a processor of the server computer system 110. For example, where the server computer system 110 is or includes an instance of the example computer system 200, the operations may be performed by the processor 210 executing instructions such as, for example, from the memory 220. Those instructions may, for example, be part of a suitable instance of the application software 310 (FIG. 3).

In performing the method 500, a server computer system 110 may be in communication with a first electronic device, such as the client computer system 100 of FIG. 1. Such communication may be by way of a network. The server computer system 110 may be or may be associated with a web server.

The method 500 may be performed after operation 406 of the method 400. That is, the method 500 may be performed after the server computer system determines that the request for the provisioning data is associated with an existing account. In at least some implementations, the method 500 may be performed after the operation 408 of the method 400. That is, the method 500 may be performed after the special provisioning data is sent.

Figure 9:
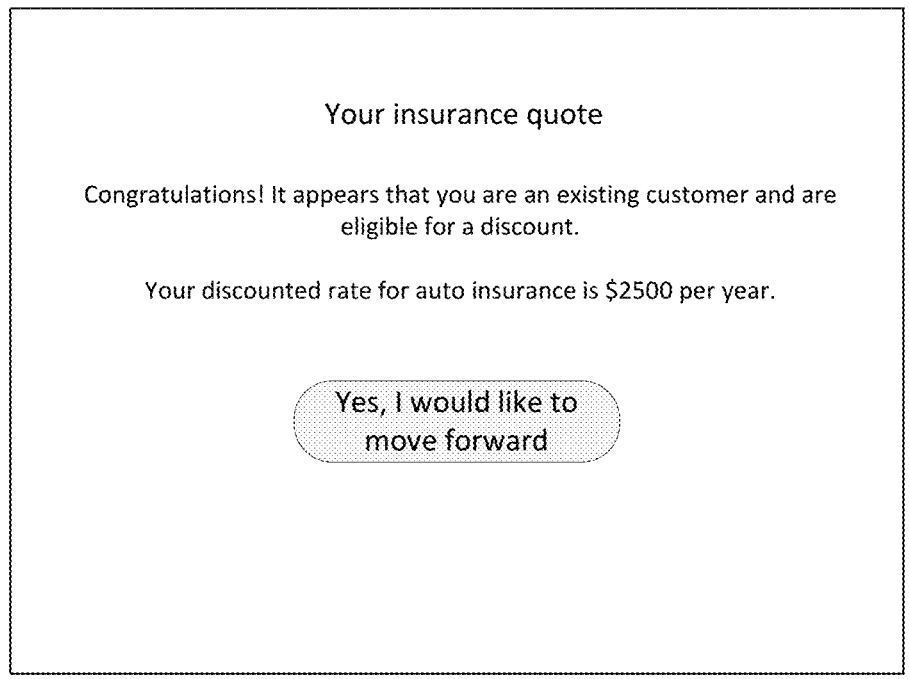
FIG. 9 is an example user interface.

The method 500 may begin at an operation 502. At the operation 502, the server computer system may receive, from the client computer system, a request to proceed with provisioning based on the provisioning data. The request may be received, for example, in response to activation on the client computer system of a suitable interface element, such as an interface element of the interface 900 of FIG. 9 (e.g., the "Yes, I would like to move forward" button of FIG. 9).

Responsive to receiving the request to proceed with provisioning based on the provisioning data, the server computer system generates a one-time password at an operation 504. Such generation may be performed using a random number generator or a pseudo-random number generator. Next, at an operation 506, the server computer system sends an indication of the one-time password to an address associated with the existing account determined to be associated with the request for the provisioning data. The one-time password is sent to an address, such as a messaging address, that was previously associated with the existing account (i.e. the association existed prior to the method 400 having been performed to send the special provisioning data). That is, the one-time password is sent to a retrieved messaging address, such as an email address that was stored in association with an existing account.

The server computer system may update an interface displayed on the client computer system 100 with an interface 1000 (FIG. 10) that requests input of the one-time-password. That is, in addition to sending the one-time password to the messaging address, the server computer system may send, to the client computer system, a request to input the one-time password. The request may be in the form of a prompt.

Figure 10:
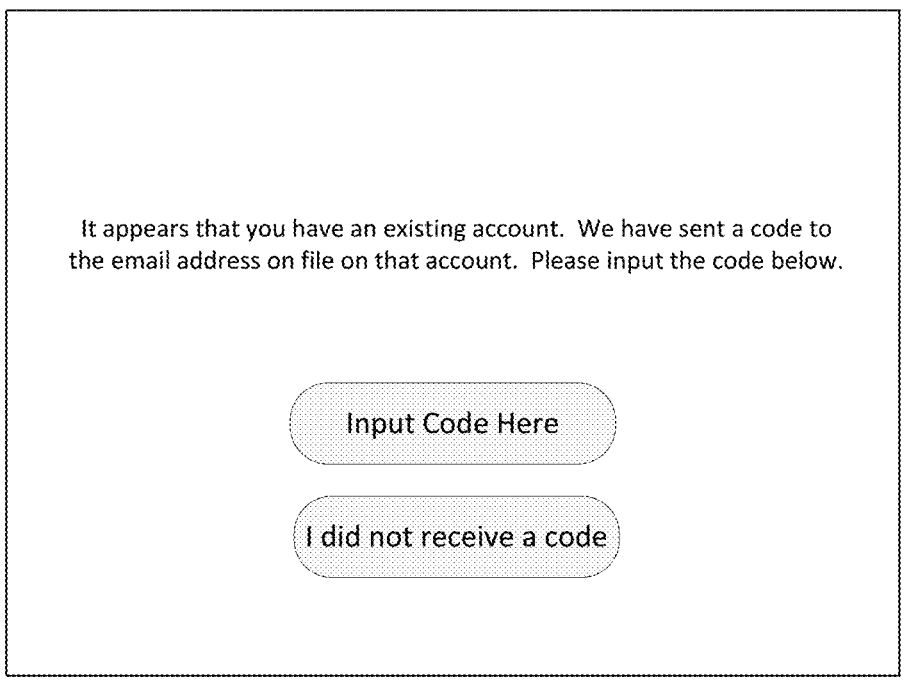
FIG. 10 is a further example user interface.

At an operation 508, the server computer system 110 receives, from the first electronic device, an indication including a value purported to be the one-time password. For example, such a value may be received through input at the interface 1000 (FIG. 10).

Then, at an operation 510, the server computer system 110 compares the one-time password to the value purported to be the one-time password. If the server confirms that the value purported to be the one-time password matches the one-time password, an operation 512 is performed. That is, upon confirming that the value purported to be the one-time password matches the one-time password, the server computer system 110 provisions (at operation 512) the existing account based on the provisioning data.

In at least some implementations, provisioning the existing account based on the provisioning data may include configuring the account to enable a feature or product. The product may, for example, be an insurance product or service such as, for example, automobile or home insurance.

If, instead at operation 510, the server computer system 110 determines that the value purported to be the one-time password does not match the one-time password, then at an operation 514 the server computer system may perform an alternate provisioning procedure. The alternate provisioning procedure may prevent continued use of the special provisioning data.

Figure 6:
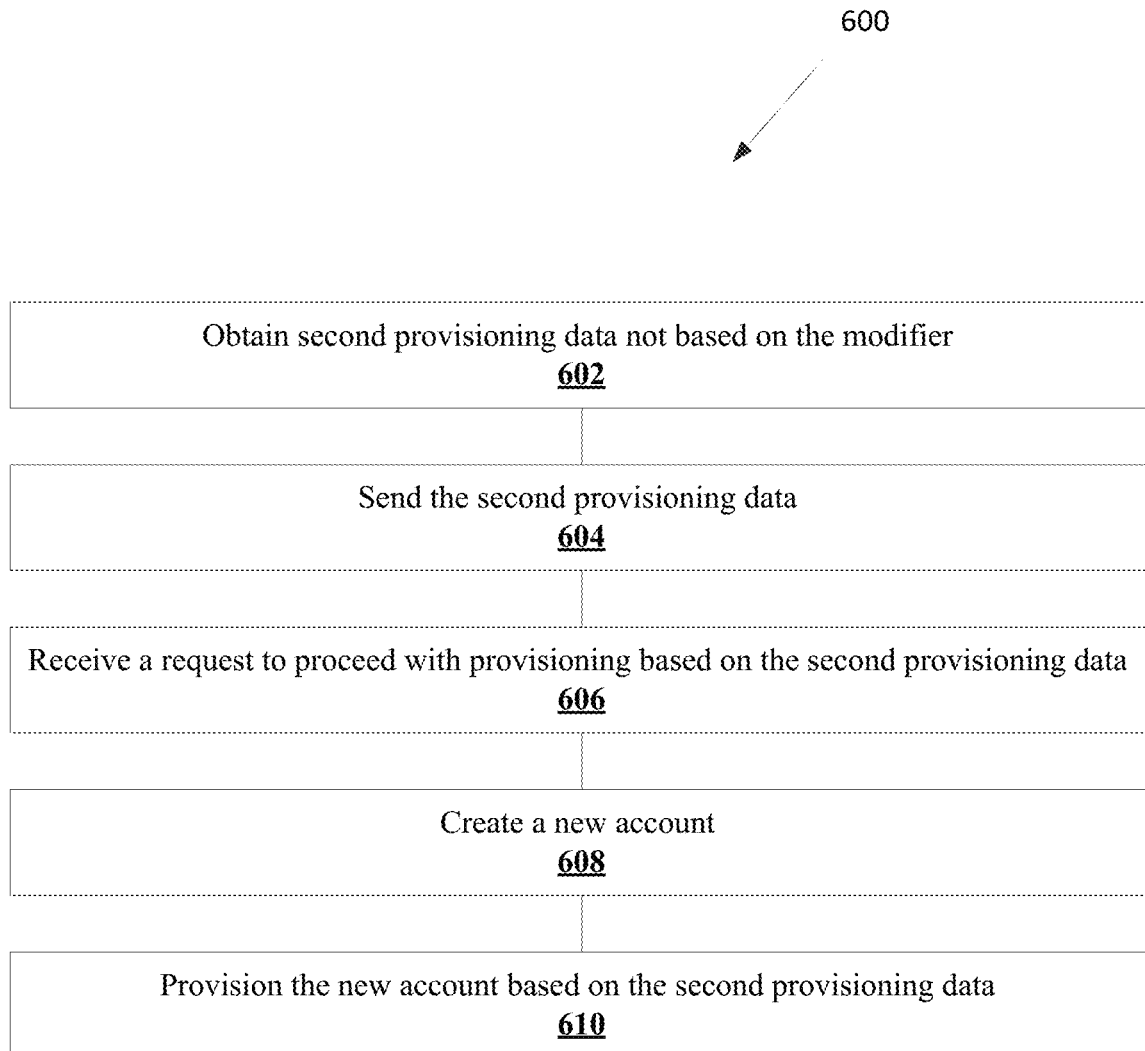
FIG. 6 is a flowchart showing operations performed in performing alternate provisioning.
Figure 7:
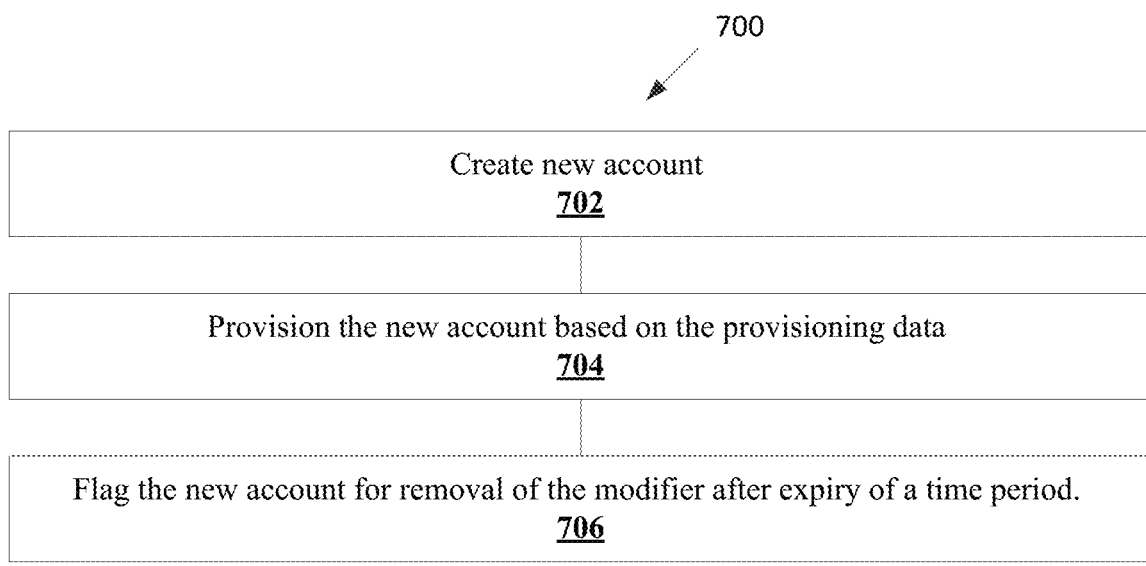
FIG. 7 is a flowchart showing operations performed in performing alternate provisioning.

By way of example, an alternate provisioning procedure is illustrated in flowchart form in the method 600 of FIG. 6 and a further alternate provisioning procedure is illustrated in flowchart form in the method 700 of FIG. 7. One or more of these methods may be performed by a processor of the server computer system 110. For example, where the server computer system 110 is or includes an instance of the example computer system 200, the operations may be performed by the processor 210 executing instructions such as, for example, from the memory 220. Those instructions may, for example, be part of a suitable instance of the application software 310 (FIG. 3).

One or more of the methods 600 may be performed at the operation 514 of the method 500 of FIG. 5.

Referring first to FIG. 6, the operations of the method 600 may be performed after determining that the value purporting to be the one-time password does not match the one-time password.

At an operation 602, the server computer system 110 obtains second provisioning data that is not based on the modifier. For example, the server computer system 110 may obtain regular or non-special provisioning data that does not rely upon the modifier that was used to obtain the special provisioning data. Then, at an operation 604, the server computer system 110 sends the second provisioning data to the first electronic device (i.e., the client computer system). For example, the server may send a message to the client computer system indicating that the value purporting to be the one time password did not, in fact, match the one time password and indicating that the special provisioning data is, therefore, not available but that other regular provisioning data is available. For example, where the provisioning data represents a quote, the server computer system may provide a new quote as the second provisioning data (i.e., the regular provisioning data).

Next, at an operation 606, the server computer system receives, from the first electronic device, a request to proceed with provisioning based on the second provisioning data and, responsive to receiving the request to proceed with provisioning based on the second provisioning data, the server may, at an operation 608, create a new account and, at an operation 610, provision the new account based on the second provisioning data.

Referring now to FIG. 7, in some instances, after the server computer system determines that the value purporting to be the one-time password does not match the one-time password, the server computer system may, at operation 702, create a new account and, at operation 704, provision the new account based on the provisioning data. That is, the server may provision the new account with the special provisioning data rather than, as with the case of the method 600 of FIG. 6, preventing the use of the special provisioning data. This may be useful in order to avoid any unnecessary friction in the account creation process that might be caused by providing alternate provisioning data (as in the case of the method 600).

However, even though the server computer system allows use of the special provisioning data, it may flag the account for removal of the modifier at a later time at an operation 706. For example, the server computer system may flag the account for removal of the modifier after expiry of a time period. For example, in at least some implementations, the provisioning data may need to be periodically renewed and, upon renewal, the renewed provisioning data may be obtained without using the modifier.

Figure 8:
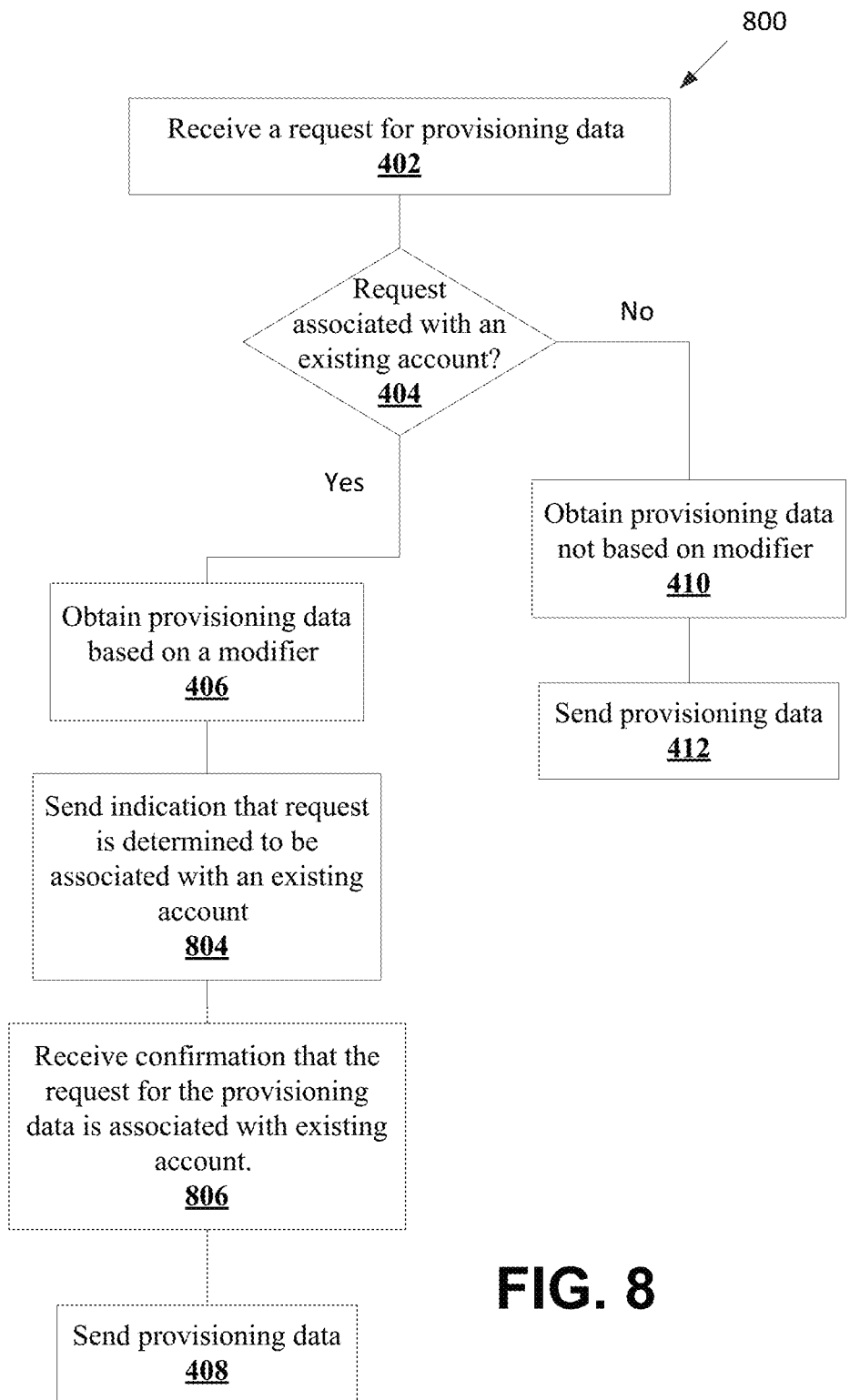
FIG. 8 is a flowchart showing operations performed in sending provisioning data.

Reference will now be made to FIG. 8 which illustrates a further example method 800 of sending provisioning data to a client computer system which may also be referred to as a first electronic device.

In performing the method 800, operations starting from an operation 402 and continuing onward are performed by a processor of the server computer system 110. For example, where the server computer system 110 is or includes an instance of the example computer system 200, the operations may be performed by the processor 210 executing instructions such as, for example, from the memory 220. Those instructions may, for example, be part of a suitable instance of the application software 310 (FIG. 3).

In performing the method 800, a server computer system 110 may be in communication with a first electronic device, such as the client computer system 100 of FIG. 1. Such communication may be by way of a network. The server computer system 110 may be or may be associated with a web server.

The method 800 of FIG. 8 may include many operations 402, 404, 406, 408, 410, 412 that have been described above with reference to the method 400 of FIG. 4 and for the sake of readability, the description of these operations will not be repeated at length.

The method 800 includes at an operation 804, after determining that the request for the provisioning data is associated with an existing account (at operation 404), sending to the client computer system an indication that the request for the provisioning data has been determined to be associated with an existing account. The example interface 900 of FIG. 9 includes such an indication.

The method 800 may include, at an operation 806, receiving, from the first electronic device, an indication to confirm that the request for the provisioning data is associated with the existing account. That is, in some instances the server computer system may prompt the client computer system for confirmation that it is, in fact, associated with an existing account and the server may, at the operation 806, receive such confirmation.

Then, the operation 806 may be performed in response to receiving the indication to confirm that the request for provisioning data is associated with the existing account. That is, the "special" provisioning data may only be sent after confirmation of an existing account is received.

The confirmation received at operation 806 does not require proof of an existing account but rather simply requests an affirmative indication that the client computer system is associated with an existing account. By way of example, the server computer system may indicate: "It appears that you may be associated with an existing account and eligible for multi-line discounts. If so, we will need proof of your existing account later but for now can you confirm that you do, in fact, have an existing account?"

One or more of the methods 500, 600, 700 of FIGS. 5 to 7 may be performed together with the method 800 of FIG. 8.

While the methods described above have referred to a web browser operating on the client computer system to interact with the server computer system, in other implementations another type of application may be used for the interaction. For example, in some implementations, an insurance or financial application may be installed on the client computer system and used for this purpose.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system, comprising:
   a processor;
   a communications module coupled to the processor; and
   a memory coupled to the processor, the memory storing instructions that, when executed, configure the computer system to:
      receive, from a first electronic device during an unauthenticated session, a request for provisioning data, the request associated with identification data insufficient to begin an authenticated session;
      determine, based on the identification data, whether the request for the provisioning data is associated with an existing account;
      when the request for the provisioning data is determined to be associated with an existing account, obtain the provisioning data based on a modifier not available if the request for the provisioning data is not determined to be associated with an existing account;
      send the provisioning data to the first electronic device;
      receive, from the first electronic device, a request to proceed with provisioning based on the provisioning data;
      responsive to receiving the request to proceed with provisioning based on the provisioning data, generate a one-time password and send an indication of the one-time password to an address associated with the existing account determined to be associated with the request for the provisioning data;
      receive, from the first electronic device, an indication including a value purported to be the one-time password;
      compare the one-time password to the value purported to be the one-time password to confirm the value purported to be the one-time password matches the one-time password; and
      upon confirming that the value purported to be the one-time password matches the one-time password, provision the existing account based on the provisioning data.

2. The computer system of claim 1, wherein the provisioning data is a first value and the modifier is a reduction operation applied to a second value used as the provisioning data if the request for the provisioning data was not determined to be associated with an existing account.

3. The computer system of claim 2, wherein the first value defines a quantity associated with one or more data transfers to be made.

4. The computer system of claim 3, wherein provisioning the existing account based on the provisioning data comprises configuring the account to enable a feature or product.

5. The computer system of claim 1, wherein the instructions further configure the computer system to:
   after determining that the value purporting to be the one-time password does not match the one-time password:
      obtain second provisioning data that is not based on the modifier;
      send the second provisioning data to the first electronic device;
      receive, from the first electronic device, a request to proceed with provisioning based on the second provisioning data;
      responsive to receiving the request to proceed with provisioning based on the second provisioning data:
         create a new account; and
         provision the new account based on the second provisioning data.

6. The computer system of claim 1, wherein the instructions further configure the computer system to:
   after determining that the value purporting to be the one-time password does not match the one-time password:
      create a new account;
      provision the new account based on the provisioning data; and
      flag the new account for removal of the modifier after expiry of a time period.

7. The computer system of claim 1, wherein the instructions further configure the processor to send, to the first electronic device, a request to input the one-time password.

8. The computer system of claim 1, wherein the instructions further configure the computer system to:
   after determining that the request for the provisioning data is associated with an existing account, send to the first electronic device an indication that the request for the provisioning data has been determined to be associated with an existing account.

9. The computer system of claim 8, wherein the instructions further configure the computer system to:
   receive, from the first electronic device, an indication to confirm that the request for the provisioning data is associated with the existing account,
   wherein the provisioning data is sent in response to receiving the indication to confirm that the request for the provisioning data is associated with the existing account.

10. The computer system of claim 1, wherein the instructions further configure the processor to determine that the request for the provisioning data is associated with an existing account when at least a plurality of predetermined fields of the identification data match corresponding fields in the account irrespective of whether one or more other predetermined fields in the plurality of fields of the identification data do not match corresponding fields in the account.

11. The computer system of claim 1, wherein the identification data includes publicly available data and excludes a secret code.

12. A computer-implemented method comprising:
   receiving, from a first electronic device during an unauthenticated session, a request for provisioning data, the request associated with identification data insufficient to begin an authenticated session;

determining, based on the identification data, whether the request for the provisioning data is associated with an existing account;

when the request for the provisioning data is determined to be associated with an existing account, obtaining the provisioning data based on a modifier not available if the request for the provisioning data is not determined to be associated with an existing account;

sending the provisioning data to the first electronic device;

receiving, from the first electronic device, a request to proceed with provisioning based on the provisioning data;

responsive to receiving the request to proceed with provisioning based on the provisioning data, generating a one-time password and send an indication of the one-time password to an address associated with the existing account determined to be associated with the request for the provisioning data;

receiving, from the first electronic device, an indication including a value purported to be the one-time password;

comparing the one-time password to the value purported to be the one-time password to confirm the value purported to be the one-time password matches the one-time password; and upon confirming that the value purported to be the one-time password matches the one-time password, provisioning the existing account based on the provisioning data.

13. The method of claim 12, wherein the provisioning data is a first value and the modifier is a reduction operation applied to a second value used as the provisioning data if the request for the provisioning data was not determined to be associated with an existing account.

14. The method of claim 13, wherein the first value defines a quantity associated with one or more data transfers to be made.

15. The method of claim 12, wherein provisioning the existing account based on the provisioning data comprises configuring the account to enable a feature or product.

16. The method of claim 12, further comprising:

after determining that the value purporting to be the one-time password does not match the one-time password:

obtaining second provisioning data that is not based on the modifier;

sending the second provisioning data to the first electronic device;

receiving, from the first electronic device, a request to proceed with provisioning based on the second provisioning data;

responsive to receiving the request to proceed with provisioning based on the second provisioning data:

creating a new account; and provisioning the new account based on the second provisioning data.

17. The method of claim 12, further comprising:

after determining that the value purporting to be the one-time password does not match the one-time password:

creating a new account;

provisioning the new account based on the provisioning data; and flagging the new account for removal of the modifier after expiry of a time period.

18. The method of claim 12, wherein the identification data includes publicly available data and excludes a secret code.

* * * * *